United States Patent
Okumura et al.

(10) Patent No.: US 8,710,393 B2
(45) Date of Patent: Apr. 29, 2014

(54) METHOD OF BONDING METALLIC MEMBERS, AND METALLIC BONDED BODY

(75) Inventors: Shinya Okumura, Hiroshima (JP); Akira Hashimoto, Higashihiroshima (JP); Kazuyuki Shiino, Hiroshima (JP); Takeshi Fujii, Higashihiroshima (JP); Akinobu Yamagata, Hiroshima (JP); Hiroaki Hayashi, Hiroshima (JP); Tomoo Sawazaki, Higashihiroshima (JP); Kazuyuki Ishida, Hiroshima (JP); Masatoshi Hamano, Hiroshima (JP); Hiroji Sasaki, Tokorozawa (JP)

(73) Assignees: Mazda Motor Corporation, Hiroshima (JP); Origin Electric Company, Limited, Tokyo (JP)

( * ) Notice: Subject to any disclaimer, the term of this patent is extended or adjusted under 35 U.S.C. 154(b) by 519 days.

(21) Appl. No.: 12/914,473

(22) Filed: Oct. 28, 2010

(65) Prior Publication Data

US 2011/0104511 A1    May 5, 2011

(30) Foreign Application Priority Data

Nov. 4, 2009    (JP) .................................. 2009-253185

(51) Int. Cl.
*B23K 9/00*    (2006.01)
*B23K 11/093*    (2006.01)
*B23K 33/00*    (2006.01)
*F16H 48/08*    (2006.01)

(52) U.S. Cl.
CPC ............. *B23K 11/093* (2013.01); *B23K 33/006* (2013.01); *F16H 48/08* (2013.01)
USPC ...................... 219/78.16; 219/78.01; 428/594

(58) Field of Classification Search
USPC .......... 219/55, 59.1, 61.4, 78.01, 78.02, 86.1, 219/86.7, 91.2, 91.23, 93; 228/112.1, 115; 428/543, 684
See application file for complete search history.

(56) References Cited

U.S. PATENT DOCUMENTS

| | | | |
|---|---|---|---|
| 2004/0035830 A1* | 2/2004 | Ananthanarayanan et al. | 219/59.1 |
| 2004/0056001 A1* | 3/2004 | Ananthanarayanan et al. | 219/59.1 |
| 2005/0127044 A1* | 6/2005 | Nozue et al. | 219/78.02 |
| 2008/0138649 A1 | 6/2008 | Mataga et al. | |

FOREIGN PATENT DOCUMENTS

| | | |
|---|---|---|
| JP | 2004-17048 A | 1/2004 |
| JP | 2004-017048 A | 1/2004 |

OTHER PUBLICATIONS

The Extended European Search Report dated Feb. 15, 2011; European Patent Application No. 10014202.5-2302.

* cited by examiner

*Primary Examiner* — Tu B Hoang
*Assistant Examiner* — Thien S Tran
(74) *Attorney, Agent, or Firm* — Studebaker & Brackett PC

(57) ABSTRACT

By respectively abutting first and second outer diameter sections of a second metallic member against first and second inner diameter sections of a first metallic member, and energizing the first metallic member and the second metallic member using a pair of electrodes while pressurizing both metallic members in an axial direction thereof, a first junction where the first inner diameter section and the first outer diameter section are bonded and a second junction where the second inner diameter section and the second outer diameter section are bonded are formed between both metallic members, and a gap in which the metals do not come into contact with each other is formed between both junctions over a predetermined axial length. Accordingly, a high joint strength can be secured using less energy for bonding.

1 Claim, 5 Drawing Sheets

METHOD OF BONDING METALLIC MEMBERS, AND METALLIC BONDED BODY

BACKGROUND OF THE INVENTION

1. Field of the Invention

The present invention relates to a method of bonding, by resistance heating through energization while applying pressure in an axial direction, a first metallic member including an opening and a second metallic member including an outer circumferential wall section capable of coming into partial contact with an inner circumferential wall section of the first metallic member that surrounds the opening, and the like.

2. Description of the Background Art

Conventionally, a bonding method described in Japanese Patent Application Laid-open No. 2004-17048 is known as a type of so-called ring mash welding method. Specifically, the method described in Japanese Patent Application Laid-open No. 2004-17048 is arranged so as to overlap a hollow first metallic member and a second metallic member whose outer diameter is slightly greater than an inner diameter of the first metallic member in an axial direction, and to join an inner circumferential surface of the first metallic member to an outer circumferential surface of the second metallic member by supplying a welding current while applying a pressurizing force in the axial direction.

In this case, a junction of the first metallic member and the second metallic member takes the form of a diffusion bonding instead of a fusion bonding. In other words, by energization while applying a pressurizing force on both of the metallic members, the metals at contact portions are softened and a plastic flow is generated to metallurgically join newly-formed surfaces of the metals.

A ring mash bonding method such as that described in Japanese Patent Application Laid-open No. 2004-17048 is advantageous compared to general fusion bonding such as arc welding in that segregation of carbides due to fusion, solidification cracking due to the effect of heat, and the like do not occur and that only a short period of time is required for welding.

However, with the method disclosed in Japanese Patent Application Laid-open No. 2004-17048, when, for instance, a junction area of the first metallic member and the second metallic member is enlarged for the purpose of increasing joint strength, a problem arises in that the pressurizing force and a current value must be increased accordingly, resulting in greater facility size. Therefore, there is a need to improve joint strength while minimizing the energy required for the bonding.

SUMMARY OF THE INVENTION

The present invention has been made in view of the circumstances described above, and an object of the present invention is to provide a method of bonding metallic members and a metallic bonded body capable of obtaining a high joint strength with low bonding energy.

In order to solve the problem described above, the present invention provides a method of bonding metal members, by which a first metallic member including an opening and a second metallic member including an outer circumferential wall section capable of coming into partial contact with an inner circumferential wall section of the first metallic member that surrounds the opening are bonded to each other by resistance heating through energization while applying pressure in an axial direction of the metallic members, the method comprising the steps of: forming a first inner diameter section having a predetermined inner diameter and a second inner diameter section having an inner diameter that is greater than the inner diameter of the first inner diameter section on the inner circumferential wall section of the first metallic member; forming a first outer diameter section and a second outer diameter section having outer diameters that are greater than the inner diameters of the first inner diameter section and the second inner diameter section respectively by a predetermined amount on the outer circumferential wall section of the second metallic member; and forming, by respectively abutting the first and second outer diameter sections of the second metallic member against the first and second inner diameter sections of the first metallic member and energizing the first metallic member and the second metallic member by a pair of electrodes while pressurizing both metallic members in an axial direction thereof, a first junction where the first inner diameter section and the first outer diameter section are bonded and a second junction where the second inner diameter section and the second outer diameter section are bonded between both metallic members, and further forming a gap in which the metals do not come into contact with each other between both junctions over a predetermined axial length.

BRIEF DESCRIPTION OF THE DRAWINGS

FIGS. 7A and 7B are diagrams for describing another modification of the present invention, wherein FIG. 7A illustrates a state before bonding and FIG. 7B illustrates a state after bonding.

DESCRIPTION OF THE PREFERRED EMBODIMENTS

Figure 1:
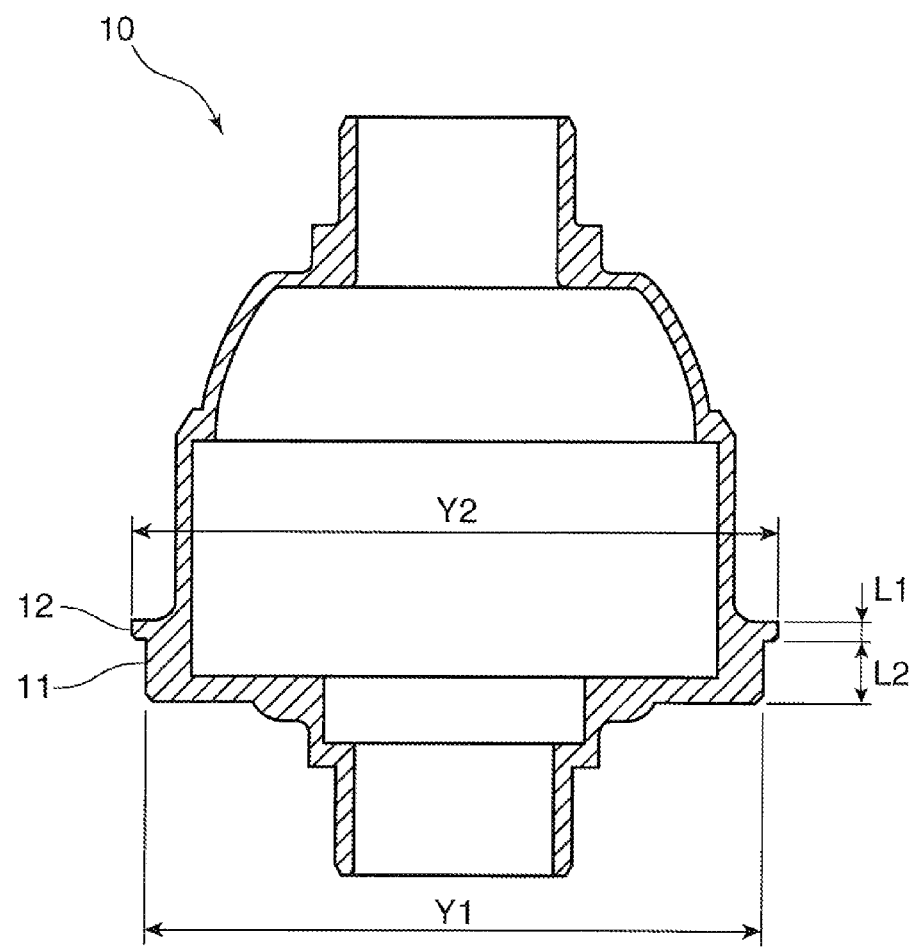
FIG. 1 is an exploded cross-sectional view of a ring gear and a differential case that are objects to be bonded.
Figure 1:
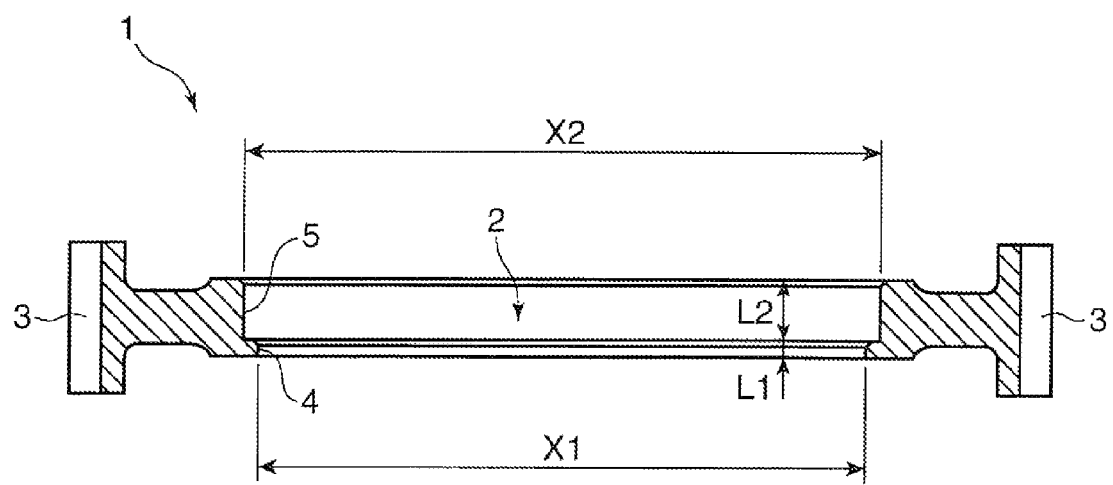

Hereinafter, a preferred embodiment of the present invention will be described with reference to the drawings. FIG. 1 is an exploded cross-sectional view illustrating a configuration of parts that are objects to be bonded according to the present embodiment. As illustrated in FIG. 1, in the present embodiment, a ring gear 1 and a differential case 10 that are parts of a vehicle are bonded using the bonding method according to the present invention.

The differential case 10 is a case (differential gear case) for storing a pinion gear and a side gear of a differential mechanism, and corresponds to the second metallic member according to the present invention. The differential case 10 is made of cast iron and spheroidal graphitic cast iron such as FCD 450 and FCD 550 is preferable as a specific example thereof.

The differential case 10 is made of a hollow body extending in an axial direction, and includes a multistage outer circumferential wall section having a plurality of large and small outer diameters. Specifically, a first outer diameter section 11 having an outer diameter of Y1 and a second outer diameter section 12 having an outer diameter of Y2 that is greater than the outer diameter Y1 are formed on the outer circumferential wall section of the differential case 10.

The ring gear 1 is a gear part which receives a driving force transmitted from a transmission and which corresponds to the first metallic member according to the present invention. The ring gear 1 is made of steel and case hardening steel such as SCR 420H is preferable as a specific example thereof.

The ring gear 1 is made of a ringed member having an opening 2 that penetrates in a thickness direction. A gear section 3 that meshes with an output gear of the transmission is formed on an outermost circumferential section of the ring gear 1. In addition, a first inner diameter section 4 having an inner diameter of X1 and a second inner diameter section 5 having an inner diameter of X2 that is greater than the inner diameter X1 are formed on an inner circumferential wall section of the ring gear 1 that surrounds the opening 2.

Figure 3:
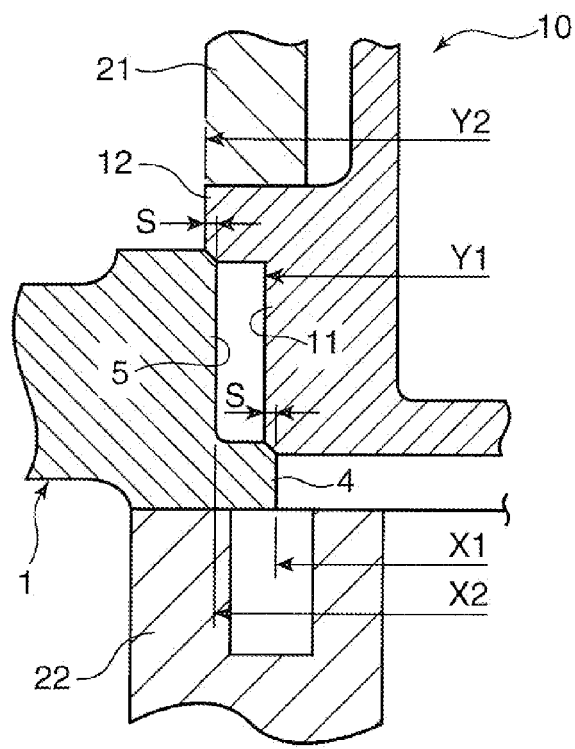
FIG. 3 is an enlarged view of section A illustrated in FIG. 2.

The relationships between the inner diameters X1 and X2 of the ring gear 1 and the outer diameters Y1 and Y2 of the differential case 10 are such that the outer diameter Y1 of the first outer diameter section 11 is slightly greater than the inner diameter X1 of the first inner diameter section 4 and the outer diameter Y2 of the second outer diameter section 12 is slightly greater than the inner diameter X2 of the second inner diameter section 5. As illustrated in FIG. 3 to be described later, differences (tightening margins) between the radii of the respective outer diameter sections 11 and 12 and the radii of the respective inner diameter sections 4 and 5 are both set to S. In this case, since the difference in diameters is 2S, relationships of "(outer diameter Y1 of the first outer diameter section 11)=(inner diameter X1 of the first inner diameter section 4)+2S", and "(outer diameter Y2 of the second outer diameter section 12)=(inner diameter X2 of the second inner diameter section 5)+2S" are established.

In addition, with regard to the axial lengths of the respective outer diameter sections 11 and 12 and the respective inner diameter sections 4 and 5, as illustrated in FIG. 1, the first inner diameter section 4 of the ring gear 1 and the second outer diameter section 12 of the differential case 10 both have axial lengths of L1, and the second inner diameter section 5 of the ring gear 1 and the first outer diameter section 11 of the differential case 10 both have axial lengths of L2, where L1<L2.

Figure 2:
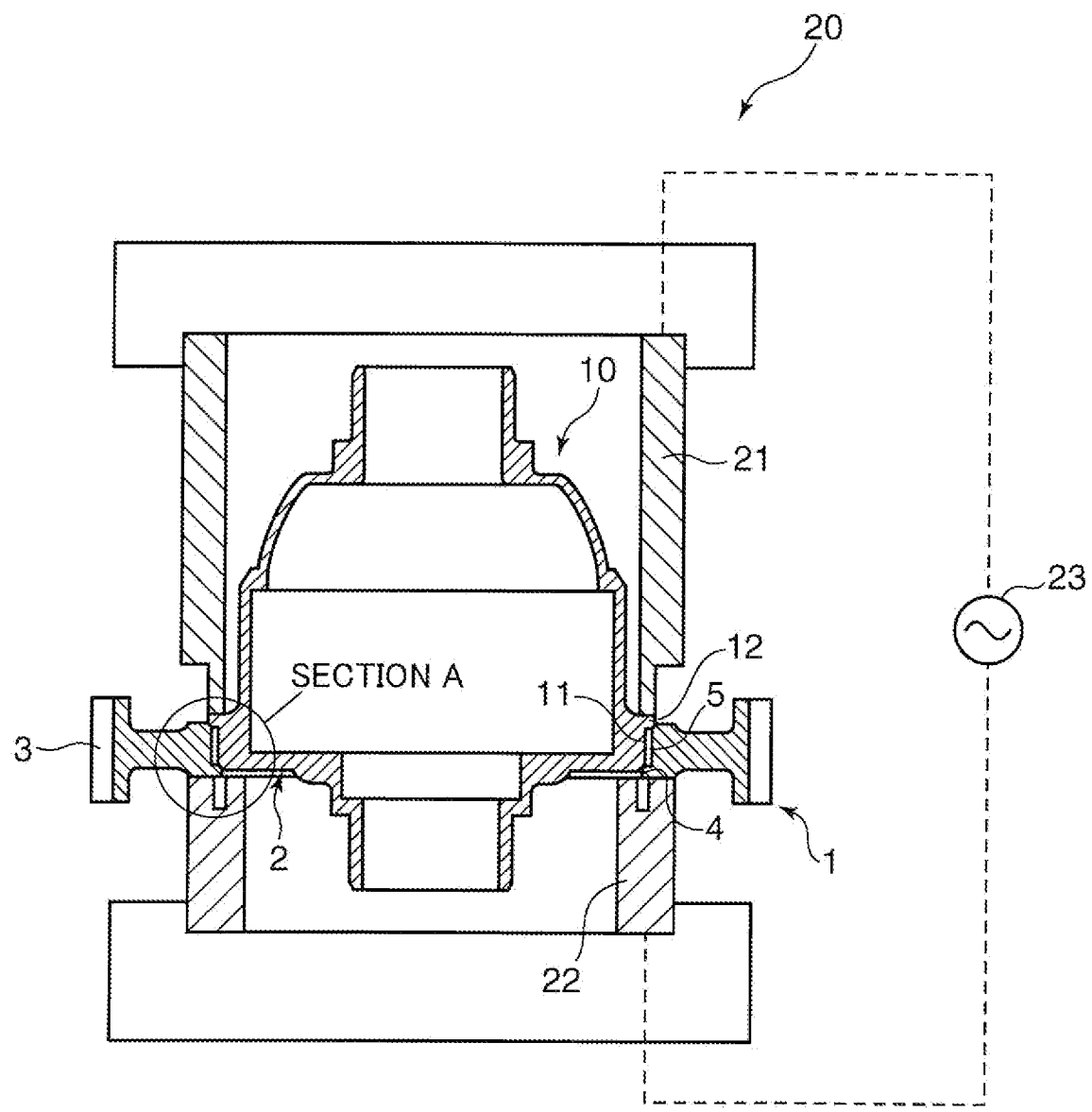
FIG. 2 is a diagram illustrating a basic configuration of a bonding apparatus used when bonding the ring gear and the differential case.

FIG. 2 is a diagram illustrating a basic configuration of a bonding apparatus 20 used when bonding the ring gear 1 and the differential case 10. As illustrated in FIG. 2, the bonding apparatus 20 includes an upper electrode 21 and a lower electrode 22, a pressurizing mechanism (not shown) that pressurizes the respective electrodes 21 and 22 in an axial direction (an upward-downward direction in FIG. 2), and a power unit 23 that supplies a high current for bonding to the respective electrodes 21 and 22. Bonding using the bonding apparatus 20 as described above is performed by energizing the ring gear 1 and the differential case 10 with the upper electrode 21 and the lower electrode 22 while pressurizing the members 1 and 10 in the axial direction, in a state where the differential case 10 is inserted into the opening 2 of the ring gear 1 to be temporarily fixed. While FIG. 2 illustrates a case where the upper electrode 21 and the lower electrode 22 are vertically arranged so as to oppose each other and the ring gear 1 and the differential case 10 are sandwiched between the upper electrode 21 and the lower electrode 22 to be bonded, for example, it is obvious that bonding can also be performed in a state where the electrodes 21 and 22 are horizontally arranged so as to oppose each other.

A procedure of bonding the ring gear 1 and the differential case 10 will now be described in more detail. In order to join the ring gear 1 and the differential case 10, first, the differential case 10 is inserted downward into the opening 2 of the ring gear 1. Specifically, the ring gear 1 is placed on the lower electrode 22 in a posture where the first inner diameter section 4 is positioned lower than the second inner diameter section 5, and the differential case 10 is inserted downward from above the ring gear 1. In doing so, the first outer diameter section 11 of the differential case 10 is set lower than the second outer diameter section 12 and the first outer diameter section 11 is inserted first into the ring gear 1.

FIG. 3 is an enlarged view of section A in FIG. 2 and illustrates a state where the aforementioned insertion operation of the differential case 10 has been completed. As described above, since the respective outer diameters Y1, Y2 of the first outer diameter section 11 and the second outer diameter section 12 of the differential case 10 are greater than the respective inner diameters X1, X2 of the first inner diameter section 4 and the second inner diameter section 5 of the ring gear 1 by precisely the tightening margin S, as illustrated in FIG. 3, when the differential case 10 is inserted into the ring gear 1, an outermost circumferential part of the first outer diameter section 11 abuts the first inner diameter section 4 and an outermost circumferential part of the second outer diameter section 12 abuts the second inner diameter section 5. In this case, since the axial length of the second inner diameter section 5 of the ring gear 1 is equal to the axial length of the first outer diameter section 11 of the differential case 10 (both have a dimension of L2 illustrated in FIG. 1), the first inner diameter section 4 and the first outer diameter section 11 as well as the second inner diameter section 5 and the second outer diameter section 12 respectively abut each other at the same time. Moreover, in the illustrated example, corners of the respective inner diameter sections 4, 5 and the respective outer diameter sections 11, 12 are chamfered and the chamfered parts are to abut each other. In this manner, the differential case 10 is temporarily fixed on the ring gear 1.

Once the temporary fixing is completed as described above, next, the ring gear 1 and the differential case 10 are sandwiched from above and below and pressurized by the upper electrode 21 and the lower electrode 22, and a voltage for bonding is applied to both electrodes 21 and 22. Specifically, the upper electrode 21 approaches the ring gear 1 and the differential case 10 which are temporarily fixed on the lower electrode 22 from above, a lower end of the upper electrode 21 abuts an upper surface of the second outer diameter section 12 of the differential case 10 and, in this state, a predetermined pressurizing force is applied to both electrodes 21 and 22 in an approaching direction (axial direction). In addition, by concurrently activating the power unit 23, a bonding voltage is applied to both electrodes 21 and 22.

In response to the application of a voltage as described above, a large current instantaneously flows between the electrodes 21 and 22 via the ring gear 1 and the differential case 10. In this case, since the ring gear 1 and the differential case 10 are in contact with each other via two points, namely, an abutting part of the first inner diameter section 4 and the first outer diameter section 11 and an abutting part of the second inner diameter section 5 and the second outer diameter section 12, the aforementioned current is to flow via the two abutting parts.

Consequently, resistance heating due to energization occurs, causing metal softening and plastic flow at both of the abutting parts. In this case, since the pressurization by the electrodes 21 and 22 is ongoing, the differential case 10 is gradually pushed downward with respect to the ring gear 1 in accordance with metal softens. Accordingly, areas of contact of the differential case 10 and the ring gear 1 (in other words, the respective areas of contact between the first inner diameter section 4 and the first outer diameter section 11 and between the second inner diameter section 5 and the second outer diameter section 12) increase, in turn causing an increase in regions where metal softens.

Figure 4:
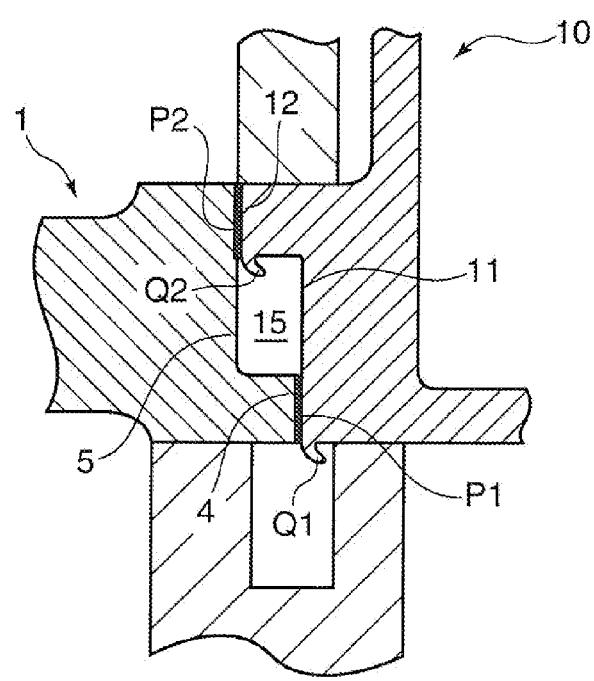
FIG. 4 is an equivalent diagram of FIG. 2 illustrating a state where bonding is completed.

Subsequently, the differential case 10 is pushed downward until the differential case 10 abuts the lower electrode 22, and in a state illustrated in FIG. 4 where the entire inner circumferential surface of the first inner diameter section 4 of the ring gear 1 comes into contact with the outer circumferential surface of the first outer diameter section 11 of the differential case 10 and the entire outer circumferential surface of the second outer diameter section 12 of the differential case 10 comes into contact with the inner circumferential surface of the second inner diameter section 5 of the ring gear 1, energization between the electrodes 21 and 22 is suspended to resolidify the metals on the respective contact surfaces, thereby forming two junctions P1 and P2 as illustrated in FIG. 4.

In other words, metal softening and plastic flow that occur at the respective contact surfaces between the first inner diameter section 4 and the first outer diameter section 11 and between the second inner diameter section 5 and the second outer diameter section 12 removes oxide film, foreign objects and the like, and by suspending energization in this state, newly-formed surfaces of the metals are metallurgically bonded to each other and resolidified. Accordingly, the first junction P1 is formed between the first inner diameter section 4 and the first outer diameter section 11 and the second junction P2 is formed between the second inner diameter section 5 and the second outer diameter section 12. Moreover, reference characters Q1 and Q2 in FIG. 4 denote burrs formed by metal pushed out, by the amount of the tightening margin S, from between the first inner diameter section 4 and the first outer diameter section 11 and from between the second inner diameter section 5 and the second outer diameter section 12.

Bonding of the ring gear 1 and the differential case 10 is completed using the processes described above. The first junction P1 and the second junction P2 formed in this case form a gap 15 therebetween in which the metals do not come contact with each other. Specifically, since the first and second inner diameter sections 4 and 5 of the ring gear 1 and the first and second outer diameter sections 11 and 12 of the differential case 10 are in a dimensional relationship illustrated in FIG. 1 and the like (in other words, Y1=(X1+2S) <Y2=(X2+2S), L1<L2), in the state after bonding, the first junction P1 and the second junction P2 are formed respectively offset in a radial direction and in an axial direction and, as a result, the gap 15 is formed over a predetermined axial length between both junctions P1 and P2.

As described above, in the present embodiment, when bonding the ring gear 1 to the differential case 10, first, the first inner diameter section 4 with an inner diameter of X1 and the second inner diameter section 5 with an inner diameter of X2 that is greater than the inner diameter of X1 are formed on the inner circumferential wall section of the ring gear 1, and the first outer diameter section 11 and the second outer diameter section 12 respectively having outer diameters Y1 and Y2 that are respectively greater than the inner diameters X1 and X2 by precisely the tightening margin S are formed on the outer circumferential wall section of the differential case 10. Subsequently, by respectively abutting the first and second outer diameter sections 11 and 12 of the differential case 10 to the first and second inner diameter sections 4 and 5 of the ring gear 1 and by pressurizing the ring gear 1 and the differential case 10 in an axial direction and energizing the ring gear 1 and the differential case 10 using the pair of electrodes 21 and 22, the first junction P1 where the first inner diameter section 4 and the first outer diameter section 11 are bonded and the second junction P2 where the second inner diameter section 5 and the second outer diameter section 12 are bonded are formed between the members 1 and 10 and, at the same time, the gap 15 in which the metals do not come contact with each other is formed over a predetermined axial length between both junctions P1 and P2. Such a configuration is advantageous in that a high joint strength can be obtained while only requiring low bonding energy.

In other words, in the embodiment described above, since the inner circumferential wall section of the ring gear 1 and the outer circumferential wall section of the differential case 10 are bonded via two junctions (first and second junctions) P1 and P2, the two junctions P1 and P2 are separated from each other in an axial direction, and the gap 15 is formed between the junctions P1 and P2, advantages can be achieved in that a superior junction structure which is particularly resistant to bending can be constructed without immoderately increasing the axial lengths (junction lengths) of the respective junctions P1 and P2 and joint strength can be effectively enhanced while avoiding an increase in the energy required by bonding.

For example, if a sole purpose is to increase joint strength, the joint strength can be increased by forming a single junction with a long junction length without dividing the junction into two parts (P1 and P2) as is the case with the embodiment described above. However, in such a case, a current value or a pressurizing force necessary during bonding increases, resulting in a larger facility and increased cost.

Figure 5:
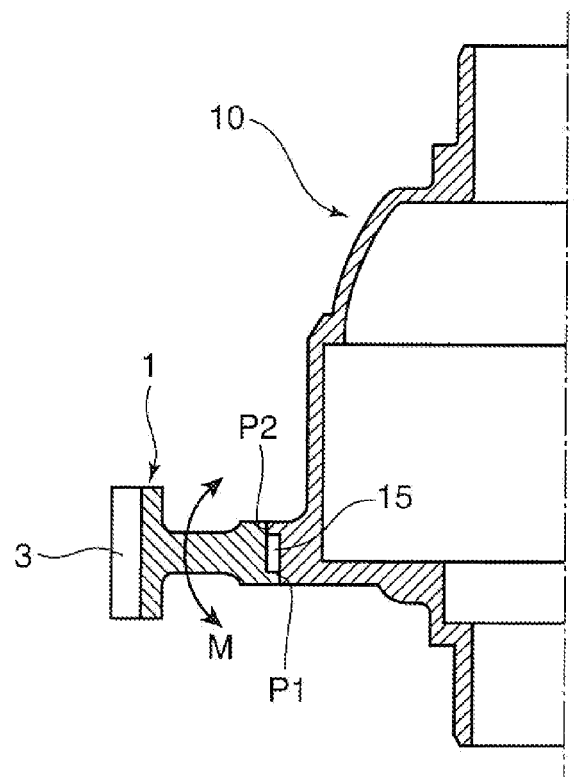
FIG. 5 is a diagram for describing a state where a bending moment is applied to the ring gear.

In contrast thereto, when forming two junctions P1 and P2 that are separated from each other in an axial direction as is the case with the embodiment described above, a modulus of section of the junctions increases in comparison to a case where, for example, the respective junctions P1 and P2 are continuously arranged in the axial direction. Therefore, in particular, when a bending moment M such as illustrated in FIG. 5 is applied on the ring gear 1, a force acting on the junctions P1 and P2 is reduced and bending rigidity is further enhanced. Moreover, since the ring gear 1 receives forces from various directions due to a driving force transferred to the gear section 3 of the ring gear 1, the reliability of the differential mechanism can be further increased by improving bending rigidity as described above.

Furthermore, since the existence of the gap 15 between the respective junctions P1 and P2 enables the burr Q2 caused by bonding to escape into the gap 15, for example, a junction of the ring gear 1 to the differential case 10 via the burr Q2 does not occur and an advantage can be achieved in that a poor junction attributable to the burr Q2 is effectively prevented.

In addition, since the above embodiment is arranged so that, at the start of bonding of the ring gear 1 and the differential case 10, the first inner diameter section 4 and the first outer diameter section 11, and the second inner diameter section 5 and the second outer diameter section 12, are simultaneously abutted to each other as illustrated in FIGS. 2 and 3 and that energization is started in this state, no variations occur in the quality of the two junctions P1 and P2 and an advantage can be achieved in that a highly reliable and uniform junction structure can be constructed.

For example, in a case where the abutting of the first inner diameter section 4 and the first outer diameter section 11 and the abutting of the second inner diameter section 5 and the second outer diameter section 12 occur at significantly different timings, an excessive current flows through whichever has been abutted first, creating a risk of a significant decrease in joint strength due to the occurrence of a phenomenon called expulsion (dispersion) in which a metallic member disperses.

In contrast, in the above embodiment, an advantage is achieved in that, by setting the abutting timings of the two locations to be the same, a situation such as described above can be avoided and joint strength can be maintained at a high level.

Figure 6:
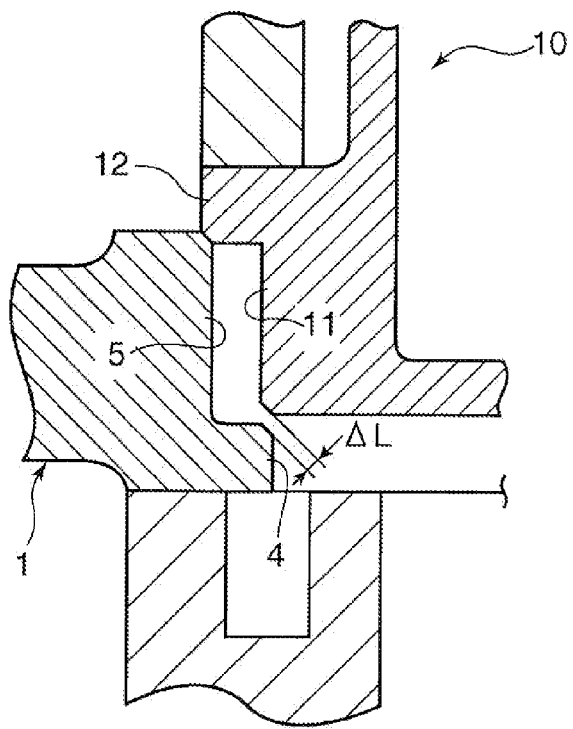
FIG. 6 is a diagram for describing a modification of the present invention.

Obviously, it is conceivable that a moderate difference in timings only results in a short overcurrent period and therefore hardly affects quality. Therefore, the abutting timings of the two locations need not necessarily be precisely the same and a moderate difference in timings may exist. For example, as illustrated in FIG. 6, in a case where a design constraint or the like does not allow the axial length of the second inner diameter section 5 of the ring gear 1 to be the same as the axial length of the first outer diameter section 11 of the differential case 10 (a case where an illustrated dimensional difference ΔL exists), a difference arises between the timing where the first inner diameter section 4 abuts the first outer diameter section 11 and the timing where the second inner diameter section 5 abuts the second outer diameter section 12. However, even in this case, if the dimensional difference ΔL is small as illustrated in FIG. 6, the difference in abutting timings is also small and bonding can conceivably be performed without incidence.

Figure 7A:
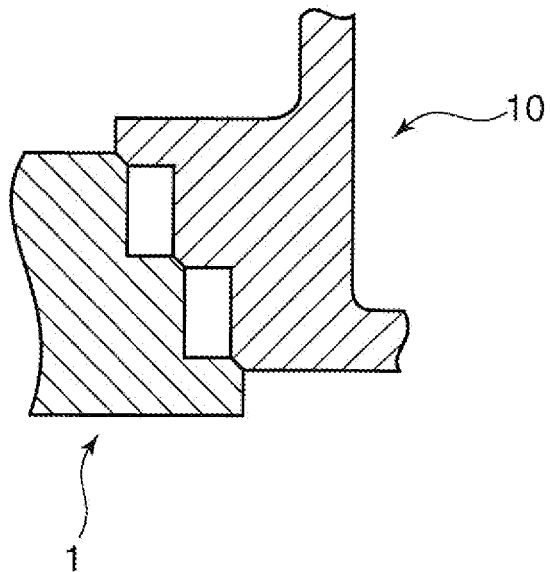
Figure 7B:
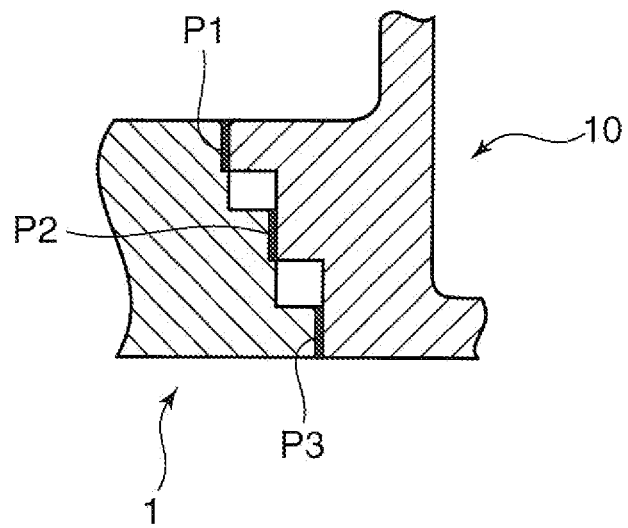

Moreover, while the ring gear 1 and the differential case 10 have been bonded via the two junctions P1 and P2 that are separated from each other in the axial direction in the embodiment described above, the number of junctions need not be limited to two and the ring gear 1 and the differential case 10 may alternatively be bonded via three or more junctions. FIGS. 7A and 7B are diagrams describing a case where three junctions (P1, P2, and P3) have been arranged, wherein FIG. 7A illustrates a state before bonding and FIG. 7B illustrates a state after bonding.

Furthermore, while a case where a steel ring gear 1 and a cast-iron differential case 10 are bonded has been described as an example in the above embodiment, the bonding method according to the present invention is naturally applicable to other metal parts made of materials not limited to steel and cast iron. Since the bonding method according to the present invention involves bonding by metal softening and plastic flow, there are less constraints on materials compared to fusion bonding such as arc welding and laser welding and the bonding method can potentially be applied to various materials.

Finally, a summarized description of configurations and advantages of the present invention disclosed based on the embodiment described above will be given.

The bonding method according to the present invention is a method of bonding metallic members, by which a first metallic member including an opening and a second metallic member including an outer circumferential wall section capable of coming into partial contact with an inner circumferential wall section of the first metallic member that surrounds the opening are bonded to each other by resistance heating through energization while applying pressure in an axial direction of the metallic members. More specifically, the method includes: forming a first inner diameter section having a predetermined inner diameter and a second inner diameter section having an inner diameter that is greater than the inner diameter of the first inner diameter section on the inner circumferential wall section of the first metallic member; and then forming a first outer diameter section and a second outer diameter section having outer diameters that are greater than the inner diameters of the first inner diameter section and the second inner diameter section respectively by a predetermined amount on the outer circumferential wall section of the second metallic member. The first and second outer diameter sections of the second metallic member are abutted respectively against the first and second inner diameter sections of the first metallic member, and the first metallic member and the second metallic member are energized by a pair of electrodes while pressurizing both metallic members in an axial direction thereof. Whereby, a first junction where the first inner diameter section and the first outer diameter section are bonded and a second junction where the second inner diameter section and the second outer diameter section are bonded are formed between both metallic members, and a gap is further formed in which the metals do not come into contact with each other between both junctions over a predetermined axial length.

With the bonding method according to the present embodiment, since the inner circumferential wall section of the first metallic member and the outer circumferential wall section of the second metallic member are bonded via two junctions (first and second junctions), the two junctions are separated from each other in an axial direction, and the gap is formed between the junctions, advantages can be achieved in that a superior junction structure which is particularly resistant to bending can be constructed without immoderately increasing the axial lengths (junction lengths) of the respective junctions, and a joint strength can be effectively enhanced while avoiding an increase in the energy required by bonding.

In the bonding method according to the present invention, favorably, at the start of bonding of the first metallic member and the second metallic member, the first inner diameter section and the first outer diameter section, and the second inner diameter section and the second outer diameter section, are simultaneously abutted to each other and energization by the electrodes is started in this state.

Consequently, no variations occur in the quality of the two junctions and a highly reliable and uniform junction structure can advantageously be constructed.

In addition, the metallic bonded body according to the present invention is a metallic bonded body, in which a first metallic member including an opening and a second metallic member including an outer circumferential wall section capable of coming into partial contact with an inner circumferential wall section of the first metallic member that surrounds the opening are bonded to each other by resistance heating through energization while applying pressure in an axial direction of the metallic members. More specifically, a first inner diameter section having a predetermined inner diameter and a second inner diameter section having an inner diameter that is greater than the inner diameter of the first inner diameter section are formed on the inner circumferential wall section of the first metallic member, a first outer diameter section and a second outer diameter section having outer diameters that are greater than the inner diameters of the first inner diameter section and the second inner diameter section respectively by a predetermined amount prior to bonding are formed on the outer circumferential wall section of the second metallic member. A first junction where the first inner diameter section and the first outer diameter section are bonded and a second junction where the second inner diameter section and the second outer diameter section are bonded are formed between the first metallic member and the second metallic member, and a gap in which the metals do not come into contact with each other is formed between both junctions over a predetermined axial length.

With the metallic bonded body according to the present invention, by bonding together the first and second metallic members via two junctions (first and second junctions) that are separated from each other in an axial direction, an advantage is achieved in that, in particular, rigidity to bending is effectively improved.

While various specific examples of the application of the metallic bonded body according to the present invention is conceivable, for example, a preferable application includes a ring gear as the first metallic member and a differential case as the second metallic member.

According to the configuration described above, an advantage is achieved in that the ring gear and the differential case (differential gear case) can be bonded by high strength and the reliability of a differential mechanism can be further enhanced.

This application is based on Japanese Patent application No. 2009-253185 filed in Japan Patent Office on Nov. 4, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method of bonding metal members, by which a ring-shaped first metallic member including an opening that penetrates in a thickness direction and a second metallic member including an outer circumferential wall section capable of coming into partial contact with an inner circumferential wall section of the first metallic member that surrounds the opening are bonded to each other by resistance heating through energization while applying pressure in an axial direction of the metallic members, the method comprising the steps of:
forming a first inner diameter section having a predetermined inner diameter and a second inner diameter section having an inner diameter that is greater than the inner diameter of the first inner diameter section on the inner circumferential wall section of the first metallic member;
forming a first outer diameter section and a second outer diameter section having outer diameters that are greater than the inner diameters of the first inner diameter section and the second inner diameter section respectively by a predetermined amount on the outer circumferential wall section of the second metallic member; and
forming, by respectively abutting the first and second outer diameter sections of the second metallic member against the first and second inner diameter sections of the first metallic member and energizing the first metallic member and the second metallic member by a pair of electrodes arranged to oppose each other, with the first and second inner diameter sections of the first metallic member and the first and second outer diameter sections of the second metallic member interposed therebetween, while pressurizing both metallic members in an axial direction thereof, a first junction where the first inner diameter section and the first outer diameter section are bonded and a second junction where the second inner diameter section and the second outer diameter section are bonded between both metallic members, and further forming a gap in which the metals do not come into contact with each other between both junctions over a predetermined axial length;
wherein, at the start of bonding of the first metallic member and the second metallic member, the first inner diameter section and the first outer diameter section, and the second inner diameter section and the second outer diameter section, are simultaneously abutted to each other and energization by the electrodes is started in this state;
the pair of electrodes includes an upper electrode and a lower electrode vertically arranged so as to oppose each other;
the first metallic member is placed on the lower electrode in a posture where the first inner diameter section is positioned lower than the second inner diameter section; and
the second metallic member is placed under the upper electrode in a posture where the first outer diameter section is positioned lower than the second outer diameter section.

* * * * *